United States Patent
Jadhav

(10) Patent No.: US 8,404,909 B2
(45) Date of Patent: Mar. 26, 2013

(54) METHOD FOR CAPTURING CARBON DIOXIDE FROM BIOMASS PYROLYSIS PROCESS

(75) Inventor: Raja A Jadhav, Benicia, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 687 days.

(21) Appl. No.: 12/634,401

(22) Filed: Dec. 9, 2009

(65) Prior Publication Data
US 2011/0132737 A1 Jun. 9, 2011

(51) Int. Cl.
*C10B 33/00* (2006.01)
*B01D 53/04* (2006.01)

(52) U.S. Cl. ............... 585/240; 201/2.5; 201/3; 201/16; 201/17; 201/21; 201/29; 201/30; 423/230

(58) Field of Classification Search ............... 201/2.5, 201/3, 16, 17, 21, 29, 30; 585/240, 242; 423/230
See application file for complete search history.

(56) References Cited

U.S. PATENT DOCUMENTS

| | | |
|---|---|---|
| 4,599,161 A | 7/1986 | Scinta et al. |
| 5,325,797 A | 7/1994 | Mei et al. |
| 5,792,340 A * | 8/1998 | Freel et al. ............... 208/127 |
| 5,961,780 A | 10/1999 | Kalkanoglu et al. |
| 6,814,940 B1 * | 11/2004 | Hiltunen et al. .............. 422/141 |
| 6,841,085 B2 | 1/2005 | Werpy et al. |
| 7,824,574 B2 * | 11/2010 | White et al. ................. 252/373 |
| 7,988,752 B2 * | 8/2011 | Andrus et al. .............. 48/197 R |
| 8,293,952 B2 * | 10/2012 | Levin ............................ 568/903 |
| 2004/0213732 A1 | 10/2004 | Lightner |
| 2009/0031929 A1 | 2/2009 | Boardman et al. |
| 2009/0253948 A1 | 10/2009 | McCall et al. |
| 2009/0299112 A1 | 12/2009 | Bauer et al. |

OTHER PUBLICATIONS

PCT International Search Report for International Application No. PCT/US2010/058888, Aug. 18, 2011.
Adam et al., "Pyrolysis of Biomass in the Presence of Al-MCM-41 Type Catalysts", *Fuel 84*, 2005, pp. 1494-1502.
Li et al., "Experimental Study of $O_2$—$CO_2$ Production for the Oxyfuel Combustion Using a Co-Based Oxygen Carrier", *Industrial & Engineering Chemistry Research*, 2008.
Mattison et al., "Chemical-looping with Oxygen Uncoupling for Combustion of solid fuels", *International Journal of Greenhouse Gas Control*, 2009, vol. 3, pp. 11-19.

* cited by examiner

*Primary Examiner* — Nina Bhat
(74) *Attorney, Agent, or Firm* — Richard J. Schulte

(57) ABSTRACT

A method of biomass pyrolysis is described which includes chemical looping of combustion char so that carbon dioxide can be captured from the combustion of the char as well as producing useable compounds from pyrolyzing biomass in a pyrolysis reactor including a metal oxide carrier particles which is in operative cooperation with a char combustor and oxidation reactor and separator for separating carbon dioxide from the flue gas produced by the char combustor.

11 Claims, 1 Drawing Sheet

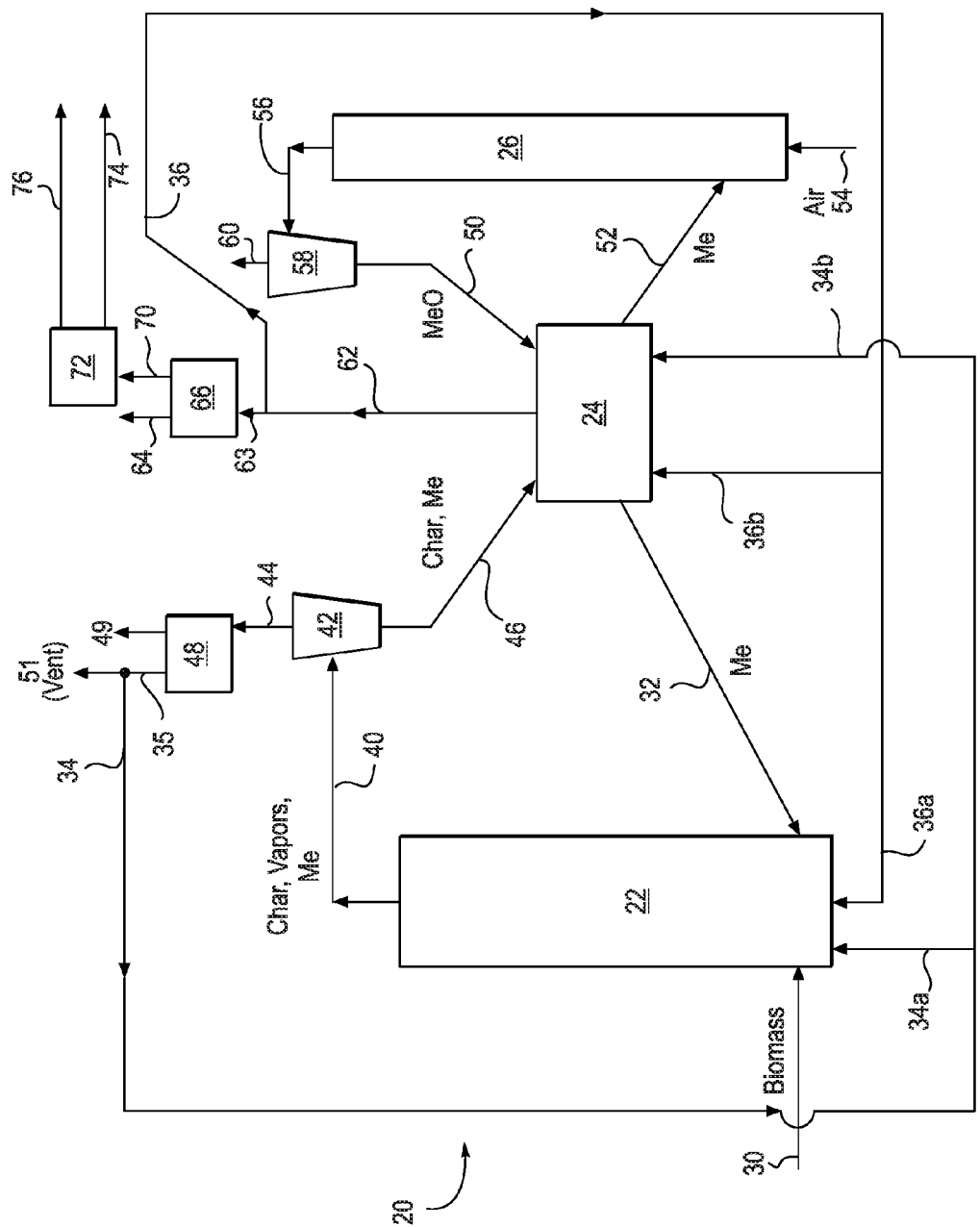

METHOD FOR CAPTURING CARBON DIOXIDE FROM BIOMASS PYROLYSIS PROCESS

FIELD OF THE INVENTION

The present invention relates generally to the pyrolysis of biomass to produce pyrolysis oil, and more particularly, to the capture of carbon dioxide during the combustion of char used to provide heat to drive the pyrolysis reaction.

BACKGROUND OF THE INVENTION

One way to reduce transportation costs of moving low-energy density biomass to processing plants is to pyrolyze the biomass close to the biomass production site and then transport high-energy density pyrolysis oil produced in the pyrolysis to the processing plants. During the biomass pyrolysis process, biomass particulates are conventionally mixed with hot sand carrying heat into a fluidized bed reactor. The biomass is pyrolyzed which involves heating the biomass at about 500° C. in an inert gas with the biomass being converted into pyrolysis oil vapors, char and other gases. The pyrolysis oil vapors, after separating from char and sand in a cyclone, are condensed at lower temperatures to produce liquid pyrolysis oil. The exact composition of the pyrolysis oil is highly dependent upon the biomass feedstock and operating conditions of the pyrolysis reactor. The separated sand and char are returned to a combustor where the char is combusted in air to supply the heat required for the pyrolysis reaction. The hot sand is returned to the fluidized bed reactor for further use in pyrolysis. The char combustion produces a flue gas stream containing carbon dioxide, nitrogen and water vapor. Although the carbon dioxide that is produced comes from renewable biomass, the process would be even more desirable if the carbon dioxide from the char combustion process could be captured and sequestered.

Oxyfiring or oxy-fuel combustion of fuel is a promising carbon dioxide capture process in which fuel is burned generally in the presence of high-purity oxygen, instead of air, to produce heat and a flue gas. Dry air contains roughly (by volume) 78.08% nitrogen, 20.95% oxygen, 0.93% argon, 0.038% carbon dioxide and trace amounts of other gases. Normal air, as compared to dry air, contains a variable amount of water vapor, on average around 1%. The oxyfiring process avoids the need to separate nitrogen gases and other trace gases from the flue gas, which would otherwise be present if air rather than primarily oxygen were burned. Furthermore, the formation of nitrous oxide is avoided or at least substantially reduced with oxyfiring.

Chemical looping combustion (CLC) is a novel concept for capturing carbon dioxide from systems generating heat and/or power. In the CLC process, oxygen for the combustion reaction is supplied by oxidized metal oxide sorbents rather than air as in conventional combustion processes. Since the fuel is not mixed with diluent nitrogen gas, the resulting flue gas consists primarily of carbon dioxide and water vapor. The water can be readily removed through condensation and a stream of high purity carbon dioxide can be produced, which is ready for compression and sequestration, such as in a subterranean reservoir.

Mattisson et al. (*Int. J. Greenhouse Gas Control*, 3, 11-19, 2009) have studied metal oxides such as manganese oxide ($Mn_2O_3$), copper oxide (CuO) and cobalt oxide ($Co_3O_4$) carried on a substrate for supplying oxygen for the combustion of solid fuels. In their process, known as chemical looping combustion (CLC), fuel and oxidized metal oxide sorbents are placed in intimate contact with each other in a fuel combustion reactor. Oxygen is released from the metal oxide sorbents during combustion with the fuel thus reducing the oxidized metal oxide sorbents into reduced metal oxide sorbents. The reduced metal oxide sorbents is then captured and recharged or regenerated with oxygen from air in an appropriate oxidation or air reactor under suitable conditions. The recharged oxidized metal oxide sorbents are then returned or "looped" to the combustion reactor for combustion with more fuel.

There is a need for a process for combusting char in a pyrolysis process wherein carbon dioxide produced in the combustion is readily captured and sequestered. Furthermore, there is a need for better quality pyrolysis oil produced during pyrolysis that remains stable during its transportation and does not deteriorate. The present invention addresses these needs.

SUMMARY OF THE INVENTION

A method for capturing carbon dioxide produced by combusting char in a biomass pyrolysis system is disclosed. A biomass is pyrolized in a pyrolysis reactor in the presence of reduced metal oxide sorbents to produce char, pyrolysis oil vapors, other off-gases and reduced metal oxide sorbents. The reduced metal oxide sorbents carry the heat used to drive the pyrolysis reaction, which typically occurs around 500° C. The pyrolysis oil vapor and the off-gases are separated from the char and reduced metal oxide sorbents. Preferably, the pyrolysis oil vapor is condensed into liquid pyrolysis oil. A portion of the off-gases can be recycled to the pyrolysis reactor and/or combustor reactor to provide a fluid stream. "Off-gases" refer to gases from the pyrolysis operation which are relatively non-condensable gases relative to the pyrolysis vapors and contain combustibles (such as hydrogen, carbon monoxide, methane, and other light hydrocarbons). The off-gases may also contain non-combustible gases, such as nitrogen and carbon dioxide.

The char and reduced metal oxide sorbents are introduced into a char combustor and the char is combusted in the presence of oxidized metal oxide sorbents received from an oxidation reactor to produce a flue gas stream of carbon dioxide, water vapor and other trace gases and reduced metal oxide sorbents. The carbon dioxide is then captured by separating the carbon dioxide from the water vapor and trace gases. A portion of the flue gas stream can be recycled to the char combustor and/or pyrolysis reactor to provide a fluid flow to the reactors. In addition, the off gases produced during biomass pyrolysis may also be recycled to the char combustor and/or pyrolysis reactor. If the off gases contain significant amounts of hydrogen, carbon monoxide, methane, ethane, propane or other hydrocarbon containing gases, this off gas may be used as fuel in the char combustor and/or pyrolysis reactor.

A first portion of the reduced metal oxide sorbents from the char combustor is oxidized, in the presence of air, in an oxidation reactor to produce oxidized metal oxide sorbents and oxygen depleted air. The oxidized metal oxide sorbents are separated from the oxygen depleted air and are recycled back into the char combustor to provide oxygen for the combustion of the char. A second portion of the reduced metal oxide sorbents remaining after combustion of the char is supplied to the pyrolysis reactor to carry heat to help drive the pyrolysis of the biomass.

It is unlikely that complete oxidation of the metal oxide sorbents will occur in the oxidation reactor. Similarly, it is unlikely that complete reduction of the metal oxide sorbents will occur in the combustion reactor during combustion.

Accordingly, "oxidized" metal oxide sorbents refers to a stream where the majority of the sorbents have been oxidized. "Reduced" metal oxide sorbents refers to a stream where the majority of the sorbents have been reduced.

The metal oxide sorbents, which carry oxygen, include metal oxides mounted on a substrate. By way of example, and not limitation, the metal oxides may be selected from the group consisting of NiO, CuO, $CO_3O_4$, $Fe_2O_3$, $Mn_2O_3$ and $CaSO_4$. Nonlimiting examples of substrates include alumina, silica, aluminosilica, titania and zirconia.

Pyrolysis oil upgrading catalyst particles may also be added to the metal oxide sorbents as part of the heat energy carrier particles used in the biomass pyrolysis system including biomass pyrolysis and chemical looping combustion of the char. By way of example and not limitation, the pyrolysis oil upgrading catalyst particles may include one or more of particles including zeolites, alumina, transition metal catalysts and mesoporous materials. As an alternative to using separate pyrolysis oil upgrading catalyst particles, one or more metals selected from Ni, Mo, Co, Cr, W, Rh, Ir, Re, and Ru may be impregnated onto the metal oxide sorbents used to transfer oxygen to the char combustor. The reduced metal oxide sorbents would then perform as a pyrolysis oil upgrading catalyst in the pyrolysis reactor in addition to transporting oxygen from the oxidation reactor to the char combustor.

A biomass pyrolysis system for producing pyrolysis oil while capturing carbon dioxide during char combustion is disclosed. The system includes a pyrolysis reactor, a char combustor and an oxidation reactor. The pyrolysis reactor pyrolyzes biomass in the presence of reduced metal oxide sorbents to produce pyrolysis oil vapors and other off gases and solids including char and the metal oxide sorbents. A separator separates the char and metal oxide sorbents from the pyrolysis oil vapors and other gases. The pyrolysis oil vapor can be condensed into liquid pyrolysis oil to separate it from other lighter off gases produced during pyrolysis.

The char combustor receives the reduced metal oxide sorbents and char and also a stream of oxidized metal oxide sorbents. Also, a supply of gas such as carbon dioxide, steam, nitrogen, inert gases, or off gases, such as those including hydrogen, carbon monoxide, carbon dioxide, methane, ethane and propane, may be supplied to the char combustor. The char combustor combusts char in the presence of the oxidized metal oxide sorbents into a flue gas including carbon dioxide, water vapor and other trace gases. One or more separators may then be used to separate the carbon dioxide from other flue gas components.

An oxidation reactor receives and oxidizes a first portion of the reduced metal oxide sorbents, in the presence of air, into oxidized metal oxide sorbents while removing a portion of oxygen from air. The oxidized metal oxide sorbents are separated from the oxygen depleted air and used in the char combustor to supply oxygen for combustion of the char. A second portion of the reduced metal oxide sorbents is transported to the pyrolysis reactor to carry heat from the combustion reactor to the pyrolysis reactor. A portion of the flue gas and/or a portion of the separated off gas stream may be recycled back to the char combustor and/or pyrolysis reactor. The metal oxide sorbents used in the biomass pyrolysis system may be augmented with pyrolysis oil upgrading catalyst particles. Accordingly, the pyrolysis oil produced during pyrolysis is of higher quality than when using the metal oxide sorbents alone as the heat energy carrying particles.

BRIEF DESCRIPTION OF THE DRAWINGS

These and other objects, features and advantages of the present invention will become better understood with regard to the following description, pending claims and accompanying drawings where:

FIG. 1 is a schematic drawing of a biomass pyrolysis system that pyrolyzes biomass and employs chemical looping combustion of char so that carbon dioxide can be readily captured from the combustion process.

DETAILED DESCRIPTION OF THE DISCLOSURE

A method and system for pyrolyzing biomass and employing chemical looping combustion of char so that carbon dioxide can be readily captured from the combustion of the char is disclosed. A pyrolysis reactor pyrolyzes a biomass in the presence of heat energy carrier particles. The heat energy carrier particles preferably include reduced metal oxide sorbents that have the ability to absorb oxygen from air in an oxidation reactor and release oxygen in a char combustor. The heat energy carrier particles may optionally include pyrolysis oil upgrading catalyst particles that upgrade the pyrolysis oil vapors produced during the pyrolysis reaction. The stream of products from the pyrolysis reactor includes char, pyrolysis oil vapors, off gases and the heat energy carrier particles.

A cyclone or other separator is used to separate solids such as char and the heat energy carrier particles from gaseous products such as the pyrolysis oil vapors and other gases produced during pyrolysis. The pyrolysis oil vapors can be condensed to produce liquid pyrolysis oil and non-condensable off-gases, which generally contain hydrogen, carbon monoxide, carbon dioxide, methane, and other light hydrocarbons. These off-gases may then be recycled back to the pyrolysis reactor to act as a fluidizing medium and/or to the char combustor to act as a fuel. Hydrogen in the off-gases may also be used to catalytically upgrade the pyrolysis oil in the pyrolyzer by the hydrotreating and hydrocracking processes. The cyclone or separator may be separate from or built into the pyrolysis reactor.

The char and heat energy carrier particles are sent to a char combustor. A supply of heat energy carrier particles including oxidized metal oxide sorbents is also delivered to the char combustor. The char is combusted in the presence of the oxidized metal oxide sorbents producing reduced metal oxide sorbents. A first portion of the heat energy carrier particles, with the now reduced metal oxide sorbents, is sent to an oxidation reactor where, in the presence of air, the reduced metal oxide sorbents are re-oxidized to the oxidized metal oxide sorbents. A portion of the oxygen in the air is removed and carried on the metal oxide sorbents. The heat energy carrier particles, including the oxidized metal oxide sorbents, are separated from the oxygen depleted air, such as by using a cyclone separator. Of course, other types of separators used to separate solids from gases can also be used. This separator can be separate from or built integral into the oxidation reactor. The oxygen depleted air may be disposed of into the atmosphere. The heat energy carrier particles, now including oxidized metal oxide sorbents, is looped back to the char combustor for use in further combustion of char.

The combustion of the char produces a flue gas stream including carbon dioxide and water vapor and possibly some other trace gases. A portion of the flue gas may be recycled back to the char combustor and/or pyrolysis reactor to provide a fluid stream to the reactors. From the remaining flue gas stream, water vapor may be condensed out leaving a stream of relatively high purity carbon dioxide and the trace gases. Depending on the purity of the carbon dioxide stream, the trace gases may be further separated from the carbon dioxide stream.

The carbon dioxide which is captured from the char combustor may be compressed and sequestered underground.

Alternatively, the captured carbon dioxide may be used in other chemical operations or else combined with other chemicals to produce solids, thereby sequestering the carbon dioxide as a solid. For example, carbon sequestration can occur by reacting naturally occurring magnesium and calcium containing minerals with carbon dioxide to form carbonates.

Pyrolysis Reactor

The pyrolysis reactor is preferably a circulating fluidized bed reactor. Other types of well known reactors, by way of non-limiting examples, may be used as well such as bubbling fluidized bed, rotating cone pyrolyzer, vacuum pyrolyzer, and auger pyrolyzer.

In a circulating fluidized bed pyrolysis reactor, a fluid such as carbon dioxide, nitrogen, or product off-gas is introduced into the bottom of the reactor. Heat energy carrier particles, such as reduced metal oxide sorbents, are then introduced into the pyrolysis reactor. Particles of biomass are added into the pyrolysis reactor to contact the heat energy carrier particles. The circulating motion of the heat energy carrier particles, the biomass particles and a flowing gas stream allows the biomass particles to be pyrolyzed. Typical operating conditions for pyrolysis include operating at temperatures of about 500° C. and at a pressure of about 1-25 bara and more preferably at about 1-4 bara.

The biomass may be dried and ground up. Nonlimiting examples of biomass materials include herbaceous crops (e.g., energy sorghum and energy cane), perennial crops (e.g., switchgrass and miscanthus), woody crops (e.g., pine, hybrid poplar, and eucalyptus), residues (agricultural and forest) and waste streams (e.g., bagasse).

Conventional pyrolysis reactors that are used to pyrolyze biomass may be used. For example, U.S. Pat. No. 5,961,780 describes an apparatus for a circulating bed fast pyrolysis reactor system. U.S. Pat. No. 5,792,340 also describes a method and apparatus for a circulating bed transport fast pyrolysis reactor system. The disclosures of these patents are hereby incorporated by reference in their entirety. However, rather than using sand as the principal heat energy carrier particles, reduced metal oxide sorbents may be used to transport heat from the char combustor to the pyrolysis reactor.

Further, in another embodiment, in addition to the metal oxide sorbents, pyrolysis oil upgrading catalyst particles may be included as part of the heat energy carrier particles. By way of example, and not limitation, these pyrolysis oil upgrading catalyst particles may include one or more of zeolites, alumina, transition metal catalysts and mesoporous materials. These pyrolysis oil upgrading catalyst particles ideally comprise at least 1 wt %, more preferably at least 5 wt % or even 10 wt % or more of the total weight of the heat energy carrier particles.

The pyrolysis oil upgrading catalysts generally function by cracking pyrolysis vapors that result in removal of oxygen in the pyrolysis oil components, thus producing desired organic distillate fraction. Accordingly, the pyrolysis oil product produced by the pyrolysis of the biomass is more stable and of better quality than conventional pyrolysis oil products made without the use of such pyrolysis oil upgrading catalyst particles.

An example of pyrolysis oil upgrading catalysts used in pyrolysis is taught by Adam et al., *Pyrolysis of biomass in the presence of Al-MCM-41 type catalysts*, Fuel, 84 (2005) 1494-1502. In this particular example, Al-MCM-41 catalysts were used to enhance or upgrade pyrolysis oil products produced from the pyrolysis of spruce wood.

Pyrolysis Separator/Cyclone

A conventional cyclone separator may be disposed downstream of the pyrolysis reactor. Alternatively, the separator may be built integrally within the pyrolysis reactor. A mixture of gases and solids is produced in the pyrolysis reactor. Solids including char and the heat energy carrier particles including the metal oxide sorbents are separated from the gaseous phase and are delivered to the char combustor. The gases include pyrolysis oil vapors and other gaseous byproducts such as hydrogen, carbon monoxide, carbon dioxide, water, methane, ethane and propane and other hydrocarbons. The pyrolysis oil vapors are cooled and condensed to separate out heavier products that form the pyrolysis oil. The non-condensable gases, referred to herein as "off-gases" may be used as a fluidizing medium in the pyrolysis reactor and/or as a fuel in the char combustor.

Char Combustor

The char combustor is preferably a bubbling fluidized bed reactor. However, other types of reactors could also be used, by way of example and not limitation, such as fixed bed, moving bed, and transport reactor. As provided above, the char combustor receives the solid particles of char and the heat energy carrier particles. The char combustor also receives heat energy carrier particles including oxidized metal oxide sorbents from the oxidation reactor. A supply of fluid, such as a carbon dioxide stream, is provided in the event a fluidized bed reactor is utilized. The char is combusted in the char combustor using oxygen supplied by the oxidized metal oxide sorbents resulting in the oxidized metal oxide sorbents being reduced and the oxygen used for combustion. The operating temperature and pressures must be conducive for oxidized metal oxide sorbents to release their oxygen. Generally, this temperature is in the range of about 600-1100° C. Pressure may be in the range of about 1-25 bara, and more preferably about 1-4 bara.

Certain solids react with oxygen to form oxidized metal oxide sorbents and decompose when heated to produce reduced metal oxide sorbents and gaseous oxygen. The metal oxide sorbents to be used in the present biomass pyrolysis system may include any one of a number of metal particles supported on a substrate that can be readily oxidized and reduced, depending on temperature and oxygen partial pressure.

By way of example and not limitation, examples of such metal oxide sorbents that produce gaseous oxygen during decomposition are shown in Table 1.

TABLE 1

| Metal Oxide Sorbents | | | |
|---|---|---|---|
| Base Metal | Reduced Metal Oxide Sorbent | Oxidized Metal Oxide Sorbent | Typical Decomposition Temperature in the Presence of Air, ° C. |
| Cu | $Cu_2O$ | $CuO$ | 1030 |
| Mn | $Mn_3O_4$ | $Mn_2O_3$ | 900 |
| Co | $CoO$ | $Co_3O_4$ | 890 |

Exemplary, reversible decomposition reactions are shown below for $CuO/Cu_2O$, $Mn_2O_3/Mn_3O_4$ and $Co_3O_4/CoO$ metal oxide sorbents;

$$4CuO \leftrightarrow 2Cu_2O + O_2(g) \quad (1)$$

$$6Mn_2O_3 \leftrightarrow 4Mn_3O_4 + O_2(g) \quad (2)$$

$$2Co_3O_4 \leftrightarrow 6CoO + O_2(g) \quad (3)$$

A number of substrates may be used to support the metal oxide sorbents. Non-limiting examples of such substrates include alumina, silica, aluminosilica, titania, zirconia, and their combinations. These supports provide high surface area to the metal oxides and improve attrition and sintering characteristics of the metal oxides. They also act as a heat storage medium.

Metal oxide sorbents including the metal oxides supported on these substrates can be prepared by techniques well known in the literature, such as wet impregnation, freeze granulation, solids mixing, or spray drying. During the preparation, a portion of the metal oxide may react irreversibly with the support forming an additional compound. The amount of metal oxide on the prepared sorbent ideally ranges from about 5-60 wt %, or more preferably from about 10-50 wt %.

The operating temperature of the char combustor will depend, in part, on the particular metal oxide sorbent which is to be utilized to deliver oxygen to the char combustor. For example, typical temperatures for decomposition for each of the aforementioned metal oxide sorbents which release gaseous oxygen in the presence of air are listed in Table 1 above.

Other metal oxide sorbents may be used as well, such as NiO, $Fe_2O_3$, and $CaSO_4$. Rather than releasing oxygen gas upon decomposition in the char combustor, as done by the metal oxides in Table 1, these metal oxide sorbents interact with the char and other combustible gases directly and produce combustion products. Since the solid-solid reaction between char and these metal oxides is very slow, char is first gasified in the presence of steam to produce CO and $H_2$, which in turn react readily with the metal oxides. Therefore, additional steam may need to be added to char combustor if the amount of steam in the recycled flue gas stream is insufficient for char gasification.

The main char gasification reactions are shown below:

$$C + H_2O(g) \leftrightarrow CO(g) + H_2(g) \quad (4)$$

$$CO(g) + H_2O(g) \leftrightarrow CO_2(g) + H_2(g) \quad (5)$$

$$C + CO_2(g) \leftrightarrow 2CO(g) \quad (6)$$

The reactions of metal oxide, denoted here as $Me_xO_y$, with $H_2$ and CO are shown below:

$$Me_xO_y + H_2(g) \leftrightarrow Me_xO_{y-1} + H_2O(g) \quad (7)$$

$$Me_xO_y + CO(g) \leftrightarrow Me_xO_{y-1} + CO_2(g) \quad (8)$$

Oxidation Reactor

The reduced metal oxide sorbents in the heat energy carrier particles are returned from the char combustor to the oxidation reactor by gravity or other means such as a screw feeder to be re-oxidized to the oxidized metal oxide sorbents. Most preferably, the oxidation reactor is a riser reactor that has a large tube height/diameter ratio as compared to a fluidized bed reactor serving as the char combustor. The velocity of the fluid flowing through the oxidation reactor is generally much higher than that flowing through the char combustor. High-velocity air carries the reduced metal oxide sorbents to the top of the oxidation reactor. During the travel through the oxidation reactor, oxygen is captured by the reduced metal oxide sorbents to produce the oxidized metal oxide sorbents. Typical operating conditions in oxidation reactor include temperatures ranging from 600 to 1100° C. Pressure may be in the range of about 1-25 bara, and more preferably from about 1-4 bara.

The air is stripped of oxygen leaving an oxygen depleted air stream. This stream and the heat energy carrier particles including the oxidized metal oxide sorbents are sent to a separator, such as a cyclone, where the heavier heat energy carrier particles including oxidized metal oxide sorbents are separated from the oxygen depleted air stream. The oxygen depleted air stream may be released to the atmosphere while the heat energy carrier particles including the oxidized metal oxide sorbents are looped back to the char combustor, ideally assisted by gravity. Loop-seals and pot-seals are typically used to prevent inter-mixing of gases between the char and the oxidation reactor. It should be noted that it is possible to achieve incomplete solid conversion in the char combustor and oxidation reactor, so that the sorbents coming in and out of the respective char combustor and oxidation reactors may contain a mixture of oxidized and reduced metal oxide sorbents.

Biomass pyrolysis oil needs to be further processed to obtain transportation liquids, chemicals or chemical feedstock. This process is generally carried out at a centralized facility, which receives pyrolysis oil from distributed pyrolysis units. The pyrolysis oil has limited stability due to the presence of unsaturated compounds and may deteriorate during its transportation and storage. Therefore, pyrolysis oil is generally upgraded using hydrotreatment and catalytic cracking processes to improve its quality by reducing its acidity, viscosity, and oxygen and water content. Deoxygenation during the catalytic upgrading process is accomplished through simultaneous hydrodeoxygenation, dehydration, decarboxylation, and decarbonylation reactions occurring in the presence of catalysts. However, upgrading of pyrolysis oil after the pyrolysis reaction incurs additional costs due to condensation and re-evaporation of the oil. Therefore, it is advantageous to carry out the pyrolysis oil upgrading in-situ, during the biomass pyrolysis process.

By way of example and not limitation, pyrolysis oil upgrading catalyst particles that could be used for pyrolysis oil upgrading include zeolites (e.g., H-ZSM-5, H-Y, H-mordenite, silicalite, and silica-alumina), alumina (e.g., α-alumina and γ-alumina), transition metal catalysts (e.g., Fe/Cr, $FeCr_2O_4$, and $Fe_2O_3$), and mesoporous materials (e.g., Al-MCM-41 and Cu/Al-MCM-41). These particles can be added to the metal oxide sorbents used in the biomass pyrolysis system to carry out in-situ upgrading of pyrolysis oil vapors in the pyrolysis unit itself. These particles also serve as a portion of the heat energy carrier particles.

The reduced metal oxide sorbents used to carry oxygen to the char combustion reaction may also act as a catalyst for the pyrolysis oil upgrading reaction. For examples, nickel (Ni) or nickel/molebdenum (Ni/Mo) dispersed on a high surface area support have been used to upgrade pyrolysis oil. By way of example and not limitation, one or more metals selected from the group consisting of Ni, Mo, Co, Cr, W, Rh, Ir, Re, and Ru may be incorporated into the metal oxide sorbents used to transfer oxygen to the char combustor. The reduced metal oxide sorbents would perform as a pyrolysis oil upgrading catalyst in the pyrolyzer. Other examples of pyrolysis oil upgrading catalyst particles may include catalysts such as those disclosed in U.S. Pat. No. 6,841,085 and U.S. Patent Application Publication No. 2009/0253948 A1, the disclosures of which are hereby incorporated by reference. Those skilled in the art will appreciate other catalysts may also be employed to provide the in-situ upgrading of the pyrolysis oil while also being used to transport heat from the char combustor. Coke deposited on the upgrading catalysts or metal oxide sorbents can be removed as carbon dioxide by combusting the coke along with char in the char combustor using oxidized metal oxide sorbents.

Detailed Description of FIG. 1

FIG. 1 shows an embodiment of a biomass pyrolysis system 20 made in accordance with the present invention. As an overview, system 20 includes a pyrolysis reactor 22, a char combustor 24 and an oxidation reactor 26. Through the use of chemical looping combustion, char is combusted in the char combustor with oxygen supplied by metal oxide sorbents received from the oxidation reactor and carbon dioxide produced in a flue gas can be readily captured. In FIG. 1, Me and MeO respectively denote reduced and oxidized forms of the metal oxide sorbents. Both Me and MeO are deposited on high surface area supports such as alumina, silica, aluminosilica, titania, or zirconia.

A first stream 30 of biomass particles and a stream 32 of heat energy carrier particles, i.e., reduced metal oxide sorbents, and fluid streams 34a and 36a are supplied to pyrolysis reactor 22. Stream 34a may be recycled off gases and stream 36a may be a portion of flue gas received from char combustor 24. Biomass is fast-pyrolyzed in a riser section of the circulating fluidized bed reactor 22 in the presence of a suitable heat transfer medium, such as heat energy carrier particles including the metal oxide sorbents and/or pyrolysis oil upgrading catalyst particles.

A first stream 40 of pyrolysis products is sent from the pyrolysis reactor 22 to a cyclone or other separator 42. The pyrolysis products include gases such pyrolysis oil vapors and other gases and solids including the reduced metal oxide sorbents and char. The separator 42 separates a stream 44 of pyrolysis oil vapors and other off gases from a stream 46 of the heavier char and heat energy carrier particles. The stream 44 of pyrolysis oil vapors is condensed in a condenser 48 to form pyrolysis oil liquid 49 and produce non-condensable stream 35 referred to herein as "off-gases." Non-condensable off-gases 35 contain combustibles (such as hydrogen, carbon monoxide, methane, and other light hydrocarbons) which are generally in gas phase at room temperature or 25° C. A first portion 34 of off-gases stream 35 is recycled partly to the pyrolysis reactor 22 as stream 34a and partly to the char combustor 24 as stream 34b. A second portion 51 of the off-gases 35 can be further processed or used exiting through a vent.

A stream 46 of char and reduced heat energy carrier particles is supplied to char combustor 24. Also, supplied to char combustor 24 is a supply stream 50 of heat energy carrier particles including oxidized metal oxide sorbents. One or both of recycle streams 34b and 36b provide a fluid stream to char combustor 24, which is preferably a bubbling fluidized bed reactor.

After combustion of char in the char combustor 24, a first portion of the heated reduced metal oxide sorbents is delivered by stream 52 to oxidation reactor 26. A stream 54 of air is introduced into oxidation reactor 26 and the reduced metal oxide sorbents in the heat energy carrier particles are oxidized with oxygen being captured by the metal oxide sorbents and stream 54 of air being stripped of oxygen. Stream 56 of heat energy carrier particles and the oxygen depleted air are transferred to a separator 58. Separator 58 separates a stream 60 of oxygen depleted air from the stream 50 of heat energy carrier particles including oxidized metal oxide sorbents which were previously described above as providing oxygen to the char combustor 24. Stream 60 of the oxygen depleted air may be released into the atmosphere.

A second portion or stream 32 of the heat energy carrier particles is received from char combustor 24 and delivered to pyrolysis reactor 22 as previously described. In this manner, heat can be conveyed from char combustor 24 to pyrolysis reactor 22.

As a result of the combustion of the char in char combustor 24, a flue gas stream 62 is produced including carbon dioxide, water vapor and some other trace gases. A first portion 36 of flue gas stream 62 is recycled back to the char combustor 24 and pyrolysis reactor 22 to act as a fluidizing medium. From a second portion 63 of stream 62, a stream 64 of water may be condensed in a water condenser 66 leaving a relatively high purity stream 70 of carbon dioxide. If desired, this stream 70 can be further separated by separation apparatus 72 into a higher purity stream 74 and stream 76 of trace gases that is vented to the atmosphere. Separation apparatus 72 may include refrigeration, membranes, or absorbents or other well known apparatus for separating carbon dioxide from other gases. The high purity carbon dioxide stream 74 may be compressed and geologically sequestered or utilized otherwise. Although not shown in FIG. 1, portions of streams 70 or 74 could also be split off to provide recycle carbon dioxide to char reactor 24 and/or pyrolysis reactor 22.

While in the foregoing specification this invention has been described in relation to certain preferred embodiments thereof, and many details have been set forth for purpose of illustration, it will be apparent to those skilled in the art that the invention is susceptible to alteration and that certain other details described herein can vary considerably without departing from the basic principles of the invention.

What is claimed is:

1. A method for capturing carbon dioxide from the combustion of char produced in biomass pyrolysis, the method comprising the steps of:

(a) pyrolyzing biomass in a pyrolysis reactor in the presence of heat energy carrier particles including metal oxide sorbents to produce char, pyrolysis oil vapors and metal oxide sorbents;

(b) separating the pyrolysis oil vapors from the char and heat energy carrier particles and transferring the char and heat energy carrier particles to a char combustor;

(c) combusting the char in the char combustor in the presence of oxidized metal oxide sorbents and producing a flue gas stream of carbon dioxide and water vapor and a stream of heat energy carrier particles including reduced metal oxide sorbents;

(d) separating the flue gas stream from the stream of heat energy carrier particles including the reduced metal oxide sorbents;

(e) separating the flue gas stream into carbon dioxide and water vapor and capturing a stream of carbon dioxide;

(f) oxidizing a first portion of the stream of heat energy carrier particles including reduced metal oxide sorbents received from the char combustor in an oxidation reactor in the presence of air to produce a regenerated stream of heat energy carrier particles including oxidized metal oxide sorbents to be used in step (c); and (g) recycling to the pyrolysis reactor of step (a) a second portion of the stream of heat energy carrier particles including reduced metal oxide sorbents.

2. The method of claim 1 wherein:
the metal oxide sorbent includes a metal oxide supported on a substrate, the metal oxide being selected from one or more of the group consisting of NiO, CuO, $CO_3O_4$, $Fe_2O_3$, $Mn_2O_3$ and $CaSO_4$.

3. The method of claim 2 wherein:
the substrate is selected from the group of consisting of one or more of alumina, silica, aluminosilica, titania and zirconia.

4. The method of claim 1 wherein:
the metal oxide sorbents further have metals incorporated therein selected from one or more of the group consisting of Ni, Mo, Co, Cr, W, Rh, Ir, Re, and Ru.

5. The method of claim 1 wherein:
the heat energy carrier particles further include pyrolysis oil upgrading catalyst particles.

6. The method of claim 5 wherein:
the pyrolysis oil upgrading catalyst particles are selected from one or more of the group consisting of zeolites, alumina, transition metal catalysts and mesoporous materials.

7. The method of claim 6 wherein:
the zeolite is selected from one or more of the group consisting of H-ZSM-5, H-Y, H-mordenite, silicalite, and silica-alumina.

8. The method of claim 6 wherein:
the alumina is selected from one or more of the group consisting of α-alumina and γ-alumina.

9. The method of claim 6 wherein:
the transition metal catalyst is selected from one or more of the group consisting of Fe/Cr, $FeCr_2O_4$, and $Fe_2O_3$.

10. The method of claim 6 wherein:
the mesoporous material is selected from one or more of the group consisting of Al-MCM-41 and Cu/Al-MCM-41.

11. The method of claim 1 wherein:
the pyrolysis oil vapor is condensed into a liquid pyrolysis oil and non-condensable off-gases produced in the pyrolysis of the biomass are used as a fuel in the char combustor and as a fluidization medium in the pyrolysis reactor.

* * * * *